(12) United States Patent
Kim et al.

(10) Patent No.: US 8,564,164 B2
(45) Date of Patent: Oct. 22, 2013

(54) MOTOR

(75) Inventors: Ju Ho Kim, Seoul (KR); Shin Young Cheong, Seoul (KR); Ki Suk Woo, Seoul (KR)

(73) Assignee: Samsung Electro-Mechanics Co., Ltd., Suwon (KR)

( * ) Notice: Subject to any disclaimer, the term of this patent is extended or adjusted under 35 U.S.C. 154(b) by 50 days.

(21) Appl. No.: 13/137,938

(22) Filed: Sep. 21, 2011

(65) Prior Publication Data

US 2012/0306304 A1    Dec. 6, 2012

(30) Foreign Application Priority Data

Jun. 3, 2011    (KR) .................. 10-2011-0053961

(51) Int. Cl.
*H02K 7/09*    (2006.01)

(52) U.S. Cl.
USPC .......................................... 310/90.5

(58) Field of Classification Search
USPC ................................... 310/90.5, 67 R
See application file for complete search history.

(56) References Cited

U.S. PATENT DOCUMENTS

| 5,675,201 A * | 10/1997 | Komura et al. ............ 310/90.5 |
| 5,783,886 A | 7/1998 | Hong |
| 6,617,732 B1 * | 9/2003 | Lin et al. .................... 310/90.5 |
| 2009/0146515 A1 * | 6/2009 | Popov et al. ............... 310/90.5 |

FOREIGN PATENT DOCUMENTS

JP    2000-161357    6/2000

* cited by examiner

*Primary Examiner* — Tran Nguyen
*Assistant Examiner* — Leda Pham

(57) ABSTRACT

A motor includes a rotating member including a first magnet, and a fixed member supporting the rotating member and including a second magnet configuring a magnetic bearing part together with the first magnet. A gap between the first and second magnets is larger than at least one of a contact prevention gap between the rotating member and the fixed member and a clearance between a shaft and a sleeve supporting the shaft.

9 Claims, 6 Drawing Sheets

MOTOR

CROSS-REFERENCE TO RELATED APPLICATIONS

This application claims the priority of Korean Patent Application No. 10-2011-0053961 filed on Jun. 3, 2011, in the Korean Intellectual Property Office, the disclosure of which is incorporated herein by reference.

BACKGROUND OF THE INVENTION

1. Field of the Invention

The present invention relates to a motor, and more particularly, to a motor having improved performance by preventing a damage to a magnet configuring a magnetic bearing part.

2. Description of the Related Art

A hard disk drive (HDD), an information storage device, reads data stored on a disk or writes data to a disk using a read/write head.

The hard disk drive requires a disk driving device capable of driving the disk. In the disk driving device, a small-sized motor is used.

In the small-sized motor, a fluid dynamic pressure bearing assembly has been used. A shaft, one of a plurality of rotating members of the fluid dynamic pressure bearing assembly, and a sleeve, a fixed member thereof, include oil interposed therebetween, such that the shaft is supported by fluid pressure generated by the oil.

In the motor according to the related art, when a hub, a rotating member, rotates, friction may be generated due to the oil. This friction may increase power consumption in the driving of the motor.

Further, when the motor according to the related art has an external impact applied thereto, a phenomenon in which the shaft contacts the sleeve may be generated. This phenomenon may cause abrasion of the shaft or the sleeve to thereby have an adverse effect on the performance of the motor.

Therefore, in the motor capable of driving the disk of the hard disk drive, research into a technology of significantly reducing power consumption in the driving of the motor and improving durability against external impacts to thereby significantly increase performance and a lifespan of the motor has been urgently demanded.

SUMMARY OF THE INVENTION

An aspect of the present invention provides a motor in which power consumption in driving thereof is significantly reduced, durability is improved, and damage to a magnet configuring a bearing is prevented to thereby significantly increase motor performance and lifespan.

According to an aspect of the present invention, there is provided a motor including: a rotating member including a first magnet; and a fixed member supporting the rotating member and including a second magnet configuring a magnetic bearing part together with the first magnet, wherein a gap between the first and second magnets is larger than at least one of a contact prevention gap between the rotating member and the fixed member and a clearance between a shaft and a sleeve supporting the shaft.

The contact prevention gap may be formed between the fixed member and a wall part protruding from the rotating member.

The wall part may protrude from a hub rotating together with the shaft.

The wall part may divide a space between the sleeve and a base, and the contact prevention gap may be at least one of the divided spaces.

The wall part may divide a space between a support part supporting an outer peripheral surface of the second magnet and a coupling part including a core coupled thereto, the core including a coil wound therearound, and the contact prevention gap may be at least one of the divided spaces.

The gap between the first and second magnets may be disposed on the same axis as that of the clearance between the shaft and the sleeve or may be disposed inside or outside the clearance between the shaft and the sleeve in a radial direction.

The first and second magnets may be magnetized in an axial direction or the radial direction.

The gap between the first and second magnets may be inclined at a predetermined angle in the axial direction.

At least one of upper surfaces and lower surfaces of the first and second magnets may have the same or a different height.

The motor may further include a fluid dynamic pressure bearing part formed in at least one of the shaft and the sleeve and providing radial dynamic pressure to the shaft by oil filled between the shaft and the sleeve.

According to another aspect of the present invention, there is provided a motor including: a shaft provided with a first magnet; a hub coupled to the shaft and rotating together with the shaft; a sleeve supporting the shaft and including a second magnet configuring a magnetic bearing part together with the first magnet; a fluid dynamic pressure bearing part formed in at least one of the shaft and the sleeve; a base including a coupling part protruding upwardly in an axial direction so that the sleeve and a core including a coil wound therearound may be coupled thereto; and a wall part protruding from the hub so as to divide a space between the support part supporting an outer peripheral surface of the second magnet of the sleeve and the coupling part, wherein a gap between the first and second magnets is larger than at least one of a contact prevention gap, which is at least one of the divided spaces, and a clearance between the shaft and the sleeve.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE INVENTION

Figure 1:
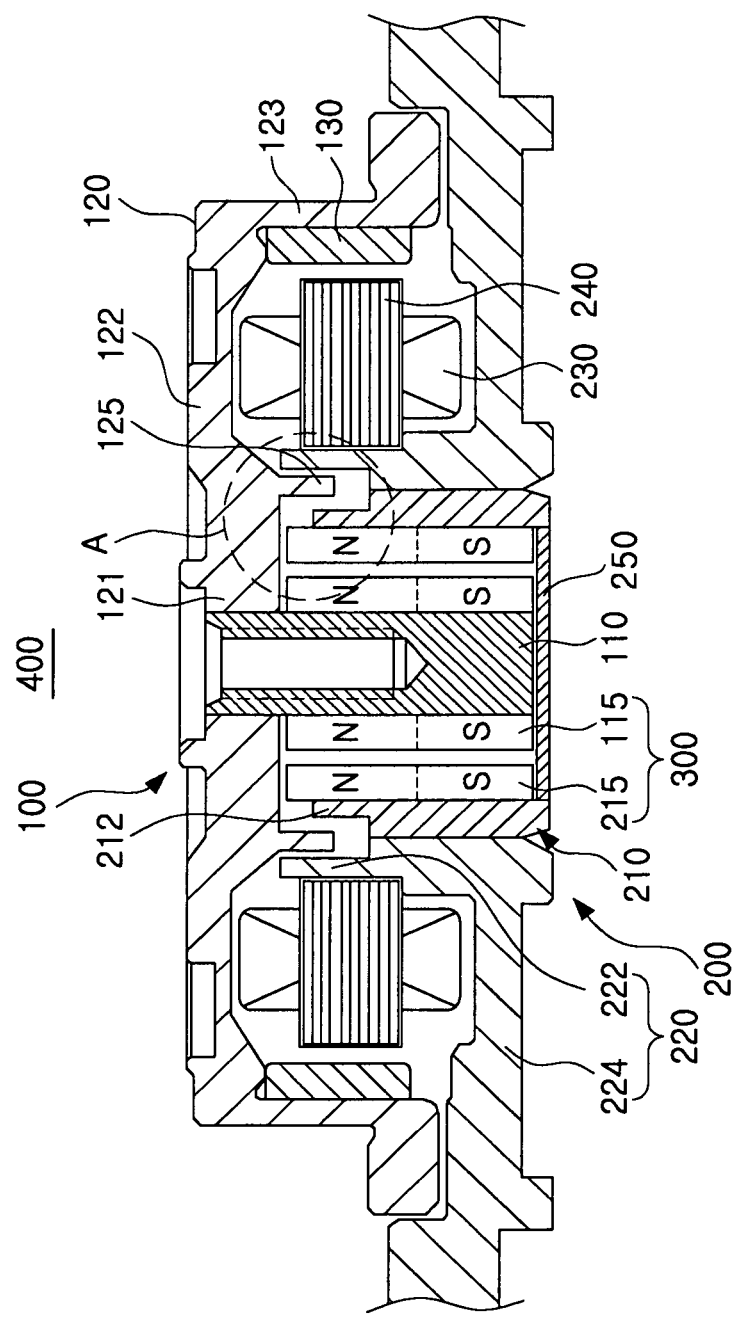
FIG. 1 is a schematic cross-sectional view showing a motor according to an embodiment of the present invention.

Embodiments of the present invention will now be described in detail with reference to the accompanying drawings. However, it should be noted that the spirit of the present invention is not limited to the embodiments set forth herein and those skilled in the art and understanding the present invention can easily accomplish retrogressive inventions or other embodiments included in the spirit of the present invention by the addition, modification, and removal of components within the same spirit, but those are construed as being included in the spirit of the present invention.

Further, like reference numerals will be used to designate like components having similar functions throughout the drawings within the scope of the present invention.

Figure 2:
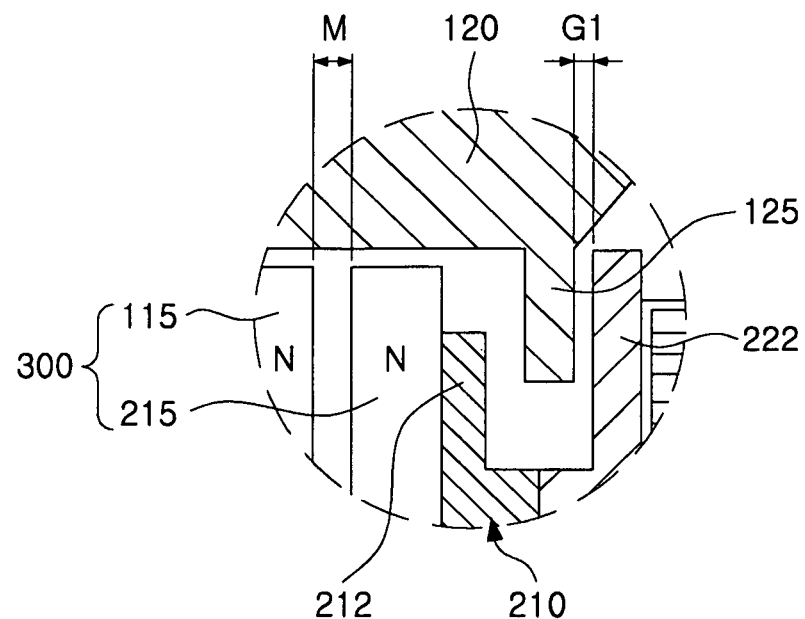
FIG. 2 is a schematic enlarged cross-sectional view showing part A of FIG. 1.

FIG. 1 is a schematic cross-sectional view showing a motor according to an embodiment of the present invention, and FIG. 2 is a schematic enlarged cross-sectional view showing part A of FIG. 1.

Referring to FIGS. 1 and 2, a motor 400 according to an embodiment of the present invention may include a rotating member 100 including a shaft 110, a fixed member 200 supporting rotation of the rotating member 100, and a wall part 125 protruding from the rotating member 100.

Terms with respect to directions will be first defined. As viewed in FIG. 1, an axial direction refers to a vertical direction based on the shaft 110, and an outer diameter or inner diameter direction refers to a direction towards an outer edge of the hub 120 based on the shaft 110 or a direction towards the center of the shaft 110 based on the outer edge of the hub 120.

Meanwhile, the motor 400 according to the embodiment of the present invention may be a motor capable of being used in a recording disk driving device rotating a recoding disk, and the rotating member 100 of the motor 400 means all components except for the fixed member 200.

More specifically, the rotating member 100 may include the shaft 110 including a first magnet 115 and a hub 120 coupled to the shaft 110 to thereby rotate together with the shaft 110.

Here, the first magnet 115 may configure a magnetic bearing part 300 together with a second magnet 215 to be described below, in the motor 400 according to the embodiment of the present invention, and may be functionally a rotating magnet because it is coupled to an outer peripheral surface of the rotating shaft 110.

Here, the first magnet 115 may be disposed to face the second magnet 215 coupled to the sleeve 210. Therefore, repulsive force may act between the first and second magnets 115 and 215.

This repulsive force may be force in a radial direction stably supporting rotation of the shaft 110 including the first magnet 115 coupled thereto and prevent the shaft 110 from rotating while being eccentric from the center thereof to thereby improve performance of the motor 400 according to the embodiment of the present invention.

Here, the first magnet 115 may be magnetized in the axial direction as shown in FIG. 1. However, the first magnet 115 is not limited to being magnetized in the above-mentioned direction but may be magnetized in the radial direction.

In addition, the first magnet 115 and the shaft 110 may be bonding coupled to each other by applying an adhesive to at least one of an outer peripheral surface of the shaft 110 and an inner peripheral surface of the first magnet 115 and may be maintained in a non-contact state therebetween by the adhesive.

Further, simultaneously with or separately from the application of the adhesive, the first magnet 115 may also be coupled to the shaft 110 in a press-fitting scheme.

In this case, the inner peripheral surface of the first magnet 115 may have a diameter smaller than that of the outer peripheral surface of the shat 110.

In addition, although not shown, the shaft 110 has an outer peripheral surface formed to be stepped so that it supports a portion of a bottom surface of the first magnet 115 to seat the bottom surface of the first magnet 115 on the stepped portion thereof, whereby the first magnet 115 and the shaft 110 may be more stably coupled to each other.

The hub 120 may be a rotating structure rotatably provided with respect to the fixed member 200 including the sleeve 210 and include an annular ring shaped driving magnet 130 provided on an inner peripheral surface thereof, wherein the annular ring shaped driving magnet 130 corresponds to the core 240 including a coil 230 wound therearound, having a predetermined interval therebetween.

More specifically, the hub 120 may include a first cylindrical wall part 121 fixed to an upper end of the shaft 110, a disk part 122 extended from an end portion of the first cylindrical wall part 121 in the outer diameter direction, and a second cylindrical wall part 123 protruding axially downwardly from an end portion of the disk part 122 in the outer diameter direction.

Here, the driving magnet 130 may be coupled to an inner peripheral surface of the second cylindrical wall part 123. Rotational driving force of the motor 400 according to an embodiment of the present invention may be obtained by electromagnetic interaction between the driving magnet 130 and the coil 230 wound around the core 240.

In addition, the hub 120 may include the wall part 125 protruding downwardly from one surface thereof in the axial direction and forming a contact prevention gap G1 with the sleeve 210 or a base 220, which are components of the fixed member 200. The wall part 125 will be described in detail after the fixed member 200 is described.

The fixed member 200 of the motor 400 according to the embodiment of the present invention may support the rotation of the rotating member 100 including the shaft 110 and the hub 120. More specifically, the fixed member may include the sleeve 210 and the base 220.

The sleeve 210 may include the second magnet 215 provided thereon, wherein the second magnet 215 is disposed to face the first magnet 115 so as to support the shaft 110. The first and second magnets 115 and 125 may configure the magnetic bearing part 300 by the repulsive force therebetween as described above.

The magnetic bearing part 300 may significantly reduce friction at the time of the rotation of the rotating member 100 to thereby significantly reduce power consumption for rotation.

Here, the second magnet 215 configuring the magnetic bearing part 300 may be magnetized in the radial or axial direction, similar to the first magnet 115.

However, when the second magnet 125 is magnetized in the same direction as the direction in which the first magnet 115 is magnetized, the repulsive force between first and second magnets 115 and 125 may be significantly increased.

A scheme of coupling the second magnet 215 and the sleeve 210 to each other may be the same as the scheme of coupling the first magnet 115 and the shaft 110 to each other described above. The sleeve 210 may have an inner peripheral surface formed to be stepped to thereby seat a bottom surface of the second magnet 215 thereon.

Here, the sleeve 210 may include a support part 212 supporting an outer peripheral surface of the second magnet 215.

However, a height of the support part 212 is not limited to a predetermined height as compared to that of the second magnet 215 but may be variously changed according to the intention of a designer.

In addition, a lower portion of the sleeve 210 in the axial direction may be closed by a base cover 250, which may be formed as a member separate from the sleeve 210.

However, the base cover 250 may be formed integrally with the sleeve 210 to thereby have a cup shape of which one side is opened and the other side is closed together with the sleeve 210.

The base 220 may be coupled to an outer peripheral surface of the sleeve 210 to thereby support the rotating member 100 together with the sleeve 210 and may include a coupling part 222 to which the core 240 including the coil 230 wound therearound is coupled and a body part 224 extended from an end portion of the coupling part 222 in the outer diameter direction.

Here, the coupling part 222 may have an outer peripheral surface formed to be stepped to thereby seat a bottom surface of the core 240 thereon simultaneously with guiding the coupling of the core 240 thereto.

Here, as a method of coupling the sleeve 210 and the core 240 to the base 220, a bonding method, a welding method, a press-fitting method, or the like, may be used. However, a method of coupling the sleeve 210 and the core 240 to the base 220 is not necessarily limited thereto.

The wall part 125 may protrude from one surface of the hub 120 which is a component of the rotating member 100, whereby the contact prevention gap G1 may be formed between the wall part 125 and the fixed member 200.

More specifically, the wall part 125 may protrude between the support part 212 of the sleeve 210 and the coupling part 222 of the base 220 and divide a space between the support part 212 and the coupling part 222.

Here, the contact prevention gap G1 may be at least one of the divided spaces. More specifically, the contact prevention gap G1 may be a space between the wall part 125 and the coupling part 222 of the base 220.

The contact prevention gap G1 may be smaller than a gap M between the first and second magnets 115 and 215 configuring the magnetic bearing part 300 of the motor 400 according to the embodiment of the present invention.

Again describing the relationship between the gap M and the contact prevention gap G1 based on the gap M between the first and second magnets 115 and 215, the gap M between the first and second magnets 115 and 215 may be larger than the contact prevention gap G1.

Through the relationship between the gap M between the first and second magnets 115 and 215 and the contact prevention gap G1, damages of the first and second magnets 115 and 215 due to external impact, or the like, may be prevented.

More specifically, a magnet configuring the magnetic bearing part may be generally formed of a sintering material, which allows the magnet to have weak brittleness.

Therefore, when the magnets contact each other due to the external impact, cracks are generated in the magnets, such that the magnets may be damaged.

However, in the case of the motor 400 according to the embodiment of the present invention, when the first and second magnets 115 and 215 are to deviate from a position in a normal state due to the external impact, or the like, the wall part 125 and the coupling part 222 are first in contact with each other by the contact prevention gap G1 relatively smaller than the gap M between the first and second magnets 115 and 215 to thereby previously block contact between the first and second magnets 115 and 215.

Here, the contact prevention gap G1 is not limited in a size thereof but may have any size as long as the wall part 125 and the coupling part 222 may be first in contact with each other when positions of the first and second magnets 115 and 215 change due to the external impact, or the like.

Additionally, oil (not shown) may be filled in the gap between the first and second magnets 115 and 215 configuring the magnetic bearing part 300 and more effectively prevent the contact between the first and second magnets 115 and 215 due to the external impact, or the like, by the oil (not shown).

In addition, the oil (not shown) may perform a damping function absorbing the external impact and further improve performance of the magnetic bearing part 300.

Figure 3:
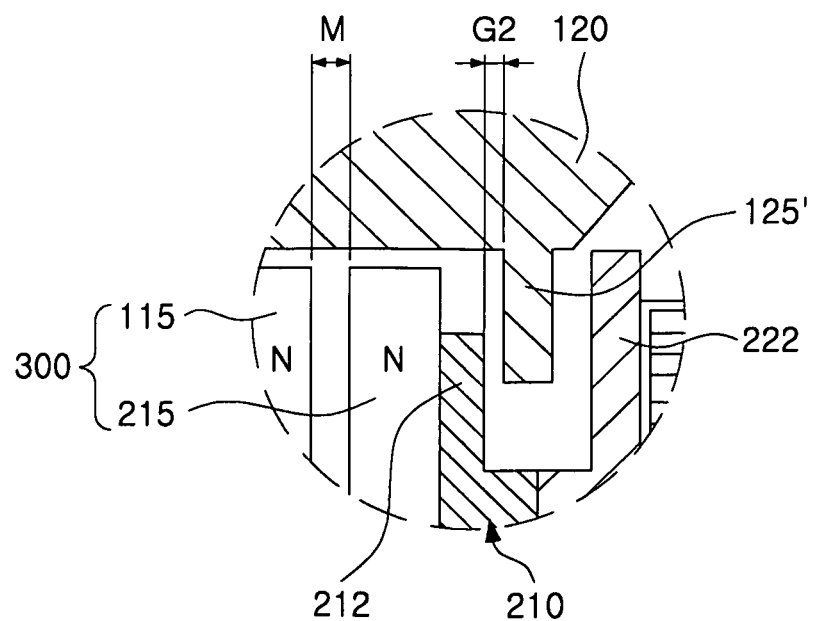
FIG. 3 is a schematic enlarged cross-sectional view showing a modified example of part A of FIG. 1.

FIG. 3 is a schematic enlarged cross-sectional view showing a modified example of part A of FIG. 1.

Referring to FIG. 3, a wall part 125' may protrude from one surface of the hub 120 and divide a space between the support part 212 and the sleeve 210 and the coupling part 222 of the base 220.

Here, a contact prevention gap G2 may be a space between the wall part 125' and the support part 212 of the sleeve 210 of the divided spaces and be smaller than the gap M between the first and second magnets 115 and 125 configuring the magnetic bearing part 300.

Therefore, in the case of the motor 400 according to the embodiment of the present invention, when the first and second magnets 115 and 215 configuring the magnetic bearing part 300 are to deviate from a position in a normal state due to the external impact, or the like, the wall part 125' and the coupling part 212 are first in contact with each other by the contact prevention gap G2 relatively smaller than the gap M between the first and second magnets 115 and 215 to thereby previously block contact between the first and second magnets 115 and 215.

Figure 4:
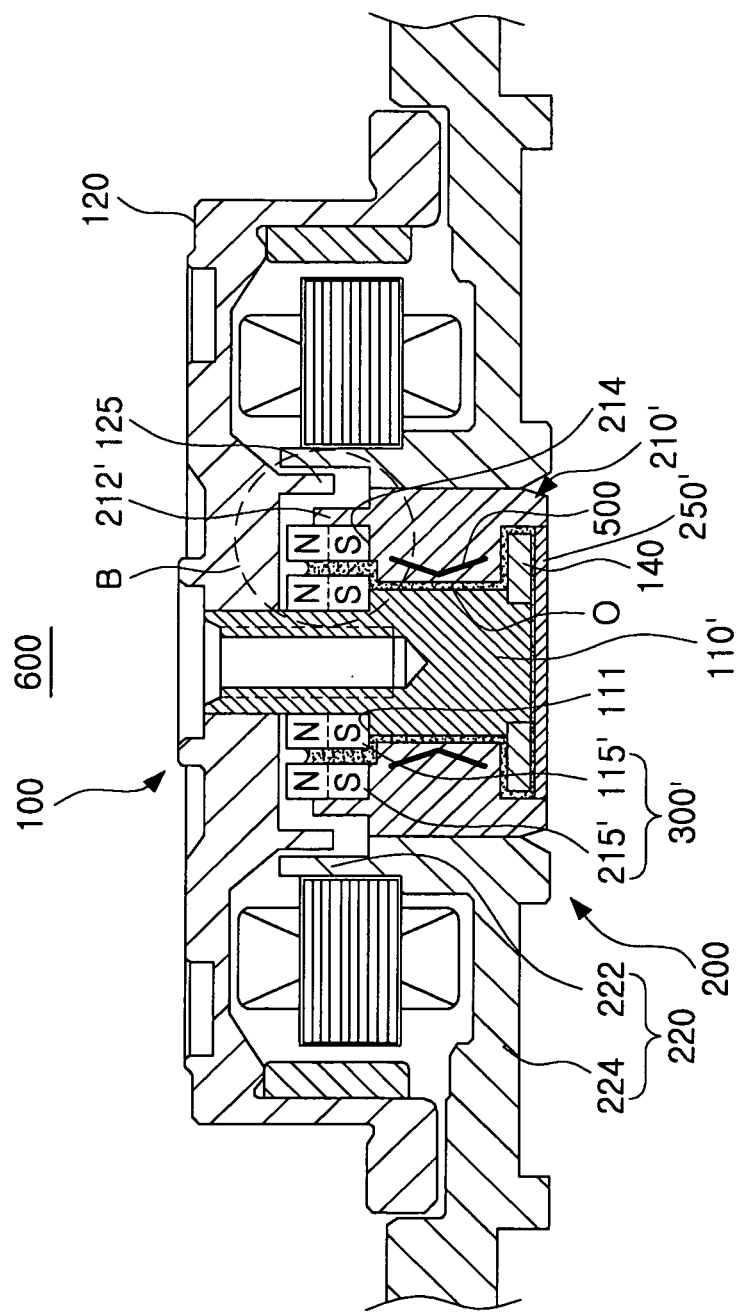
FIG. 4 is a schematic cross-sectional view showing a motor according to another embodiment of the present invention.
Figure 5:
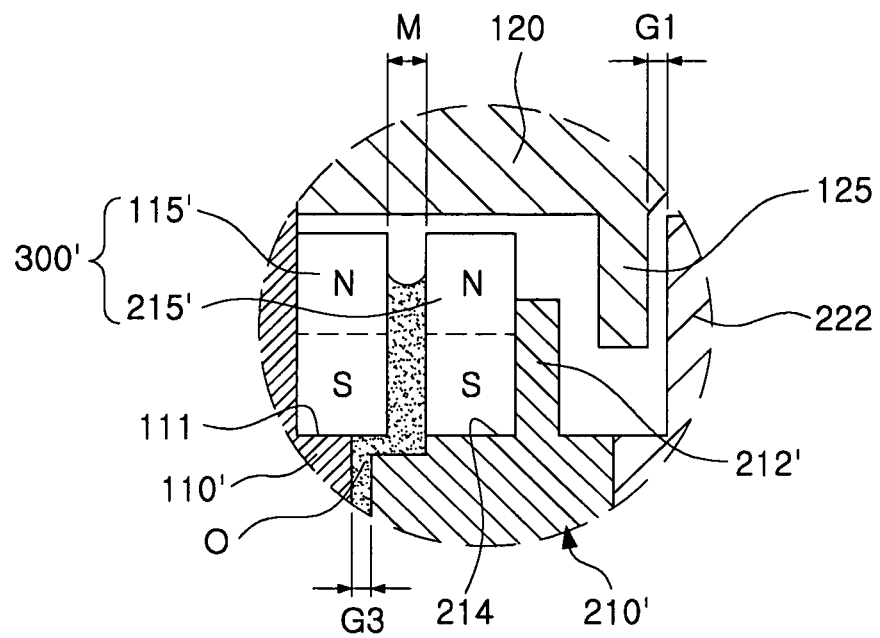
FIG. 5 is a schematic enlarged cross-sectional view showing part B of FIG. 4.

FIG. 4 is a schematic cross-sectional view showing a motor according to another embodiment of the present invention, and FIG. 5 is a schematic enlarged cross-sectional view showing part B of FIG. 4.

Referring to FIGS. 4 and 5, a motor 600 according to another embodiment of the present invention may include a magnetic bearing part 300' and a fluid dynamic pressure bearing part 500 simultaneously formed at upper and lower sides thereof, respectively.

Here, the magnetic bearing part 300' may include all of the components of the magnetic bearing part 300 configured of the first and second magnets 115 and 215 described with reference to FIGS. 1 through 3 and be different from the magnetic bearing part 300 only in a coupling method.

That is, a first magnet 115' may be seated on a reception part 111 formed to be stepped on an outer peripheral surface of a shaft 110'. More specifically, a bottom surface of the first magnet 115' may be coupled to the reception part 111.

Therefore, the first magnet 115' may be more firmly coupled to the shaft 110', and a coupling area between the first magnet 115' and the shaft 110' may increase to thereby further improve coupling force of the first magnet 115'.

Here, the sleeve 210' may include a support part 212' supporting an outer peripheral surface of the second magnet 215' and a seat part 214 supporting a bottom surface of the second magnet 215', and increase coupling force of the second magnet 215' due to the support part 212' and the seat part 214.

The fluid dynamic pressure bearing part 500 may be formed in at least one of the shaft 110' and the sleeve 210' that are positioned under the magnetic bearing part 300'.

In addition, the fluid dynamic pressure bearing part 500 may more smoothly support the rotation of the shaft 110' by oil O filled in a clearance between the shaft 110' and the sleeve 210'.

That is, the fluid dynamic pressure bearing part 500 may be formed as a groove having any one of a herringbone shape, a spiral shape, and a screw shape. However, the fluid dynamic pressure bearing part 500 is not limited to having the above-mentioned shape but may have any shape as long as radial dynamic pressure may be generated in the shaft 110'.

Here, summing up the bearing included in the motor 600 according to another embodiment of the present invention, the bearing may include the magnetic bearing part 300' including the first and second magnets 115' and 215' and the fluid dynamic pressure bearing part 500 generating the radial dynamic pressure. As a result, the bearing may be configured in a hybrid form.

In addition, a thrust dynamic pressure part (not shown) may be formed under the fluid dynamic pressure bearing part 500.

More specifically, the thrust dynamic pressure part (not shown) may be formed in at least one of upper and lower surfaces of a thrust plate 140 formed at a lower side of the shaft 110', a lower surface of the sleeve 210' corresponding to the upper surface of the thrust plate 140, and an upper surface of a base cover 250' corresponding to the lower surface of the thrust plate 140.

The trust dynamic pressure part (not shown) may be formed as a groove having any one of a herringbone shape, a spiral shape, and a screw shape, similar to the fluid dynamic pressure bearing part 500. However, the thrust dynamic pressure part is not limited to having the above-mentioned shape but may have any shape as long as strength and damping effect in the axial direction may increase by thrust dynamic pressure of the oil O.

Here, the oil O allowing the fluid dynamic pressure bearing part 500 to generate the radial dynamic pressure may be filled up to in a gap M between the first and second magnets 115' and 215' configuring the magnetic bearing part 300', and an interface of the oil O may be formed between the first and second magnets 115' and 215'.

However, the interface of the oil O is not limited to being formed between the first and second magnets 115' and 215' but may also be formed under lower surfaces of the first and second magnets 115' and 215'.

Here, the gap M between the first and second magnets 115' and 215' configuring the magnetic bearing part 300' may be larger than a clearance G3 between the shaft 110' and the sleeve 210' corresponding to the fluid dynamic pressure bearing part 500.

Through the relationship between the gap M between the first and second magnets 115' and 215' and the clearance G3 between the shaft 110' and the sleeve 210' corresponding to the fluid dynamic pressure bearing part 500, damages of the first and second magnets 115' and 215' due to external impact, or the like, may be prevented.

More specifically, as described above with reference to FIGS. 1 through 3, when the first and second magnets 115' and 215' configuring the magnetic bearing part 300' are to deviate from position in a normal state due to the external impact, or the like, the shaft 110' and the sleeve 210' are first in contact with each other by the clearance G3 between the shaft 110' and the sleeve 210' relatively smaller than the gap M between the first and second magnets 115' and 215' to thereby previously block contact between the first and second magnets 115' and 215'.

Therefore, damages of the first and second magnets 115' and 215' formed of a sintering material to have weak brittleness, due to the contact therebetween, may be prevented, whereby performance of the magnetic bearing part 300' may be improved.

In addition, the gap M between the first and second magnets 115' and 215' may be larger than a contact prevention gap G1 between a wall part 125 and a coupling part 222, simultaneously with or separately from the above-mentioned feature.

Here, a configuration in which the gap M between the first and second magnets 115' and 215' is larger than the contact prevention gap G1 between the wall part 125 and the coupling part 222, and an effect thereof, may be the same as the configuration and the effect thereof described with reference to FIGS. 1 through 3.

Additionally, the gap M between the first and second magnets 115' and 215' configuring the magnetic bearing part 300' may be formed outside the clearance G3 between the shaft 110' and the sleeve 210' corresponding to the fluid dynamic pressure bearing part 500 in the radial direction.

Therefore, when the rotating member 100 including the shaft 110' rotates, a diameter of the clearance G3 between the shaft 110' and the sleeve 210' corresponding to the fluid dynamic pressure bearing part 500 is reduced, whereby friction by the oil O may be reduced.

Figure 6:
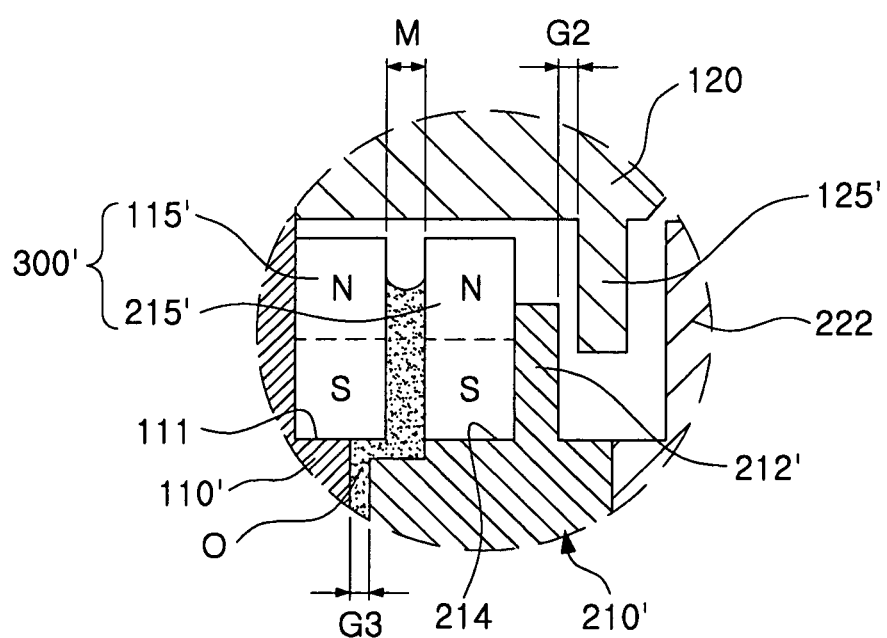
FIGS. 6 through 8 are schematic enlarged cross-sectional views showing first through third modified examples of part B of FIG. 4.
Figure 7:
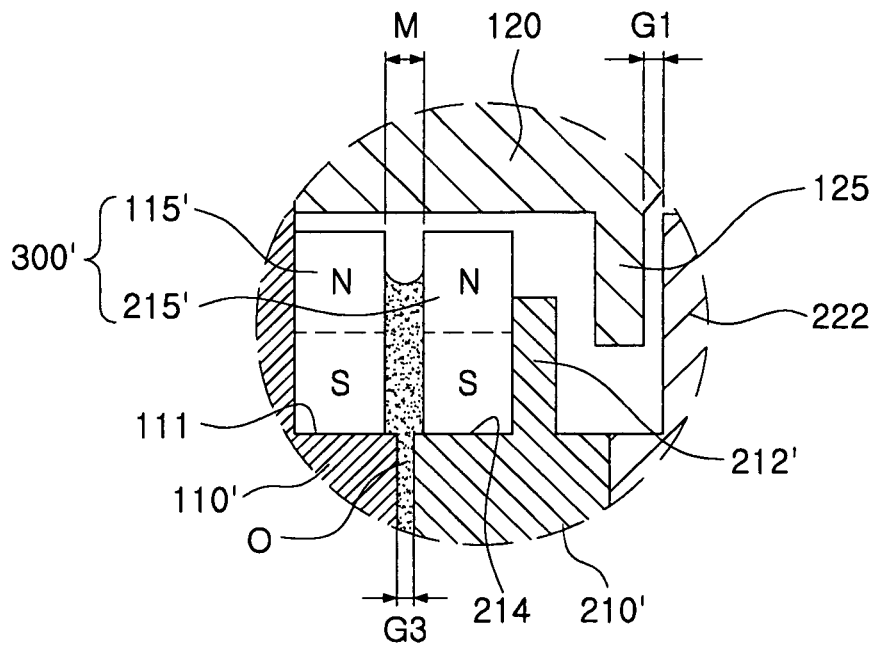
Figure 8:
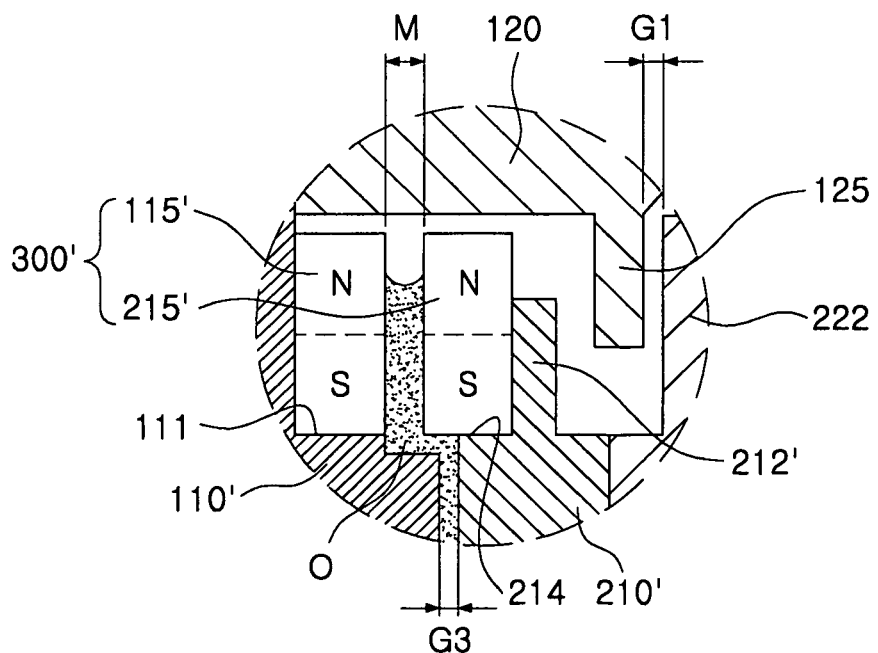

FIGS. 6 through 8 are schematic enlarged cross-sectional views showing first through third modified examples of part B of FIG. 4.

Referring to FIG. 6, a gap M between the first and second magnets 115' and 215' configuring the magnetic bearing part 300' may be larger than a contact prevention gap G2 between the support part 212' of the sleeve 210' and the wall part 125'.

In addition, the gap M between the first and second magnets 115' and 215' may be larger than a clearance G3 between the shaft 110' and the sleeve 210' corresponding to the fluid dynamic pressure bearing part 500, simultaneously with or separately from the above-mentioned feature.

Through the relationship among the gap M between the first and second magnets 115' and 215', the contact prevention gap G2, and the clearance G3 between the shaft 110' and the sleeve 210', the damages of the first and second magnets 115' and 215' due to the external impact, or the like, may be prevented.

Referring to FIG. 7, the gap M between the first and second magnets 115' and 215' configuring the magnetic bearing part 300' may be formed on the same axis as that of the clearance G3 between the shaft 110' and the sleeve 210' corresponding to the fluid dynamic pressure bearing part 500.

In addition, the relationship among the gap M between the first and second magnets 115' and 215', the contact prevention gaps G1, and G2, and the clearance G3 between the shaft 110' and the sleeve 210' may be the same as the relationship described with reference to FIG. 6.

Referring to FIG. 8, the gap M between the first and second magnets 115' and 215' configuring the magnetic bearing part 300' may be formed inside the clearance G3 between the shaft 110' and the sleeve 210' corresponding to the fluid dynamic pressure bearing part 500 in the radial direction.

Therefore, when the rotating member 100 including the shaft 110' rotates, a diameter of the clearance G3 between the shaft 110' and the sleeve 210' corresponding to the fluid dynamic pressure bearing part 500 is increased, whereby radial strength by the oil O may be increased.

In addition, the relationship among the gap M between the first and second magnets 115' and 215', the contact prevention gaps G1, and G2, and the clearance G3 between the shaft 110' and the sleeve 210' may be the same as the relationship described with reference to FIG. 6.

Figure 9:
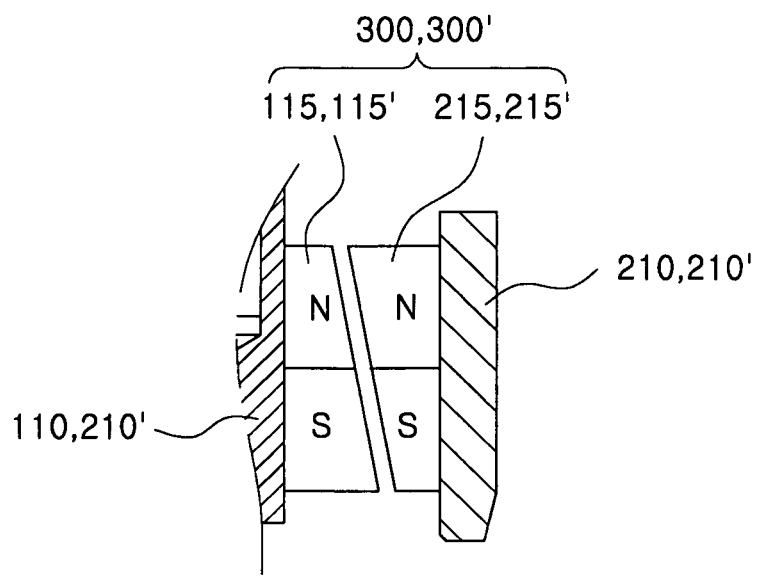
FIGS. 9 and 10 are schematic cross-sectional views showing a position relationship between first and second magnets included in a motor according to an embodiment of the present invention.
Figure 10:
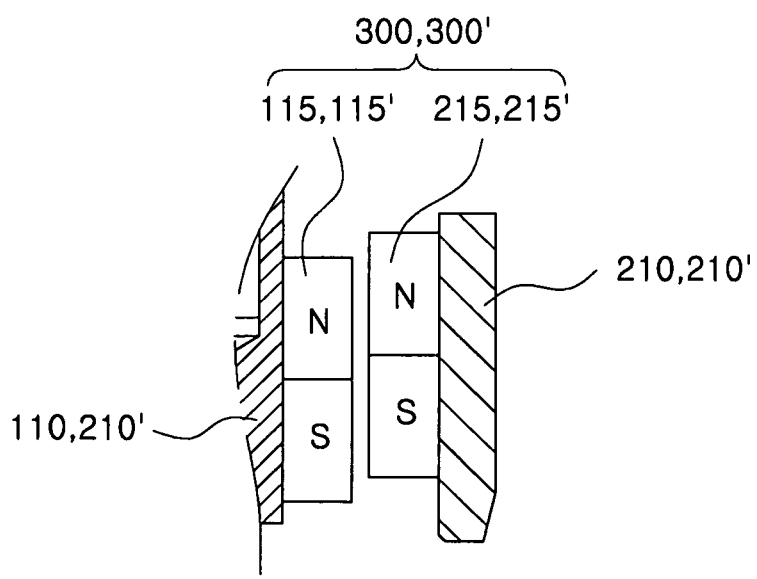

FIGS. 9 and 10 are schematic cross-sectional views showing a position relationship between first and second magnets included in a motor according to an embodiment of the present invention.

Referring to FIG. 9, the gap M between the first magnet 115 or 115' and the second magnet 215 or 215' configuring the magnetic bearing part 300 or 300' in the motor 400 or 600 according to the embodiments of the present invention may be inclined in the axial direction by a predetermined angle.

However, although FIG. 9 shows a case in which the gap is inclined in the inner diameter direction from a lower side thereof toward an upper side thereof, the gap is not limited to being inclined in the above-mentioned direction but may also be inclined in the outer diameter direction.

In addition, as described above, this feature may also be applied to a case in which the first magnets 115 or 115' and the second magnet 215 and 215' are magnetized in the radial direction.

Referring to FIG. 10, upper surfaces of the first magnet 115 or 115' and the second magnet 215 or 215' configuring the magnetic bearing part 300 or 300' in the motor 400 or 600 according to the embodiments of the present invention may have different heights.

That is, as shown in FIG. 10, the upper surface of the second magnet 215 or 215' may have a height higher than that of the upper surface of the first magnet 115 or 115', and vice versa.

In addition, the upper surface of the first magnet 115 or 115' may have a height higher than that of the upper surface of the second magnet 215 or 215' and a lower surface of the first magnet 115 or 115' may have a height lower than that of a lower surface of the second magnet 125 or 125', and vice versa.

Additionally, all of these features may also be applied to a case in which the first magnet 115 or 115' and the second magnet 215 or 215' are magnetized in the radial direction.

The position relationship between the first magnet 115 or 115' and the second magnet 215 or 215' as described above may allow the repulsive force to be generated in the axial direction as well as in the radial direction between the first magnet 115 or 115' and the second magnet 215 or 215', thereby preventing the rotating member 100 including the shaft 110 or 110' from being excessively floated.

In the case of the motor 400 or 600 according to the embodiment of the present invention, the gap M between the first magnet 115 or 115' and the second magnet 215 or 215' configuring the magnetic bearing part 300 or 300' is larger than at least one of the contact prevention gaps G1 and G2 and the clearance G3 between the shaft 110 or 110' and the sleeve 210 or 210', whereby the damages caused by the contact between the first magnet 115 or 115' and the second magnet 215 or 215' due to the external impact, or the like, may be previously prevented.

As set forth above, with the motor according to the embodiments of the present invention, the power consumption in driving the motor may be significantly reduced and the durability may be improved.

In addition, the contact between the magnets configuring the bearing due to the external impact is prevented, whereby the damages of the magnets may be prevented.

Further, the rotation of the rotating member is stably supported by the bearing, whereby the performance and the lifespan of the motor may be significantly increased.

While the present invention has been shown and described in connection with the embodiments, it will be apparent to those skilled in the art that modifications and variations can be made without departing from the spirit and scope of the invention as defined by the appended claims.

What is claimed is:

1. A motor comprising:
    a shaft including a first magnet;
    a sleeve supporting the shaft and including a second magnet configuring a magnetic bearing part together with the first magnet;
    a hub coupled to the shaft and rotating together with the shaft; and
    a wall part protruding from the hub in an axial direction,
    wherein a gap between the first and second magnets, in a radial direction, is larger than of a contact prevention gap between an inner peripheral surface of the wall part and an outer peripheral surface of the sleeve, in a radial direction.

2. A motor comprising:
    a rotating member including a first magnet; and
    a fixed member supporting the rotating member and including a second magnet configuring a magnetic bearing part together with the first magnet,
    wherein a gap between the first and second magnets is larger than at least one of a contact prevention gap between the rotating member and the fixed member and a clearance between a shaft and a sleeve supporting the shaft, a wall part protrudes from the rotating member and
    divides a space between a support part supporting an outer peripheral surface of the second magnet and a coupling part including a core coupled thereto, the core including a coil wound therearound, and
    the contact prevention gap is at least one of the divided spaces.

3. The motor of claim 1, wherein the gap between the first and second magnets is disposed on the same axis as that of a clearance between the shaft and the sleeve or is disposed inside or outside a clearance between the shaft and the sleeve in a radial direction.

4. The motor of claim 1, wherein the first and second magnets are magnetized in an axial direction or the radial direction.

5. The motor of claim 1, wherein the gap between the first and second magnets is inclined at a predetermined angle in the axial direction.

6. The motor of claim 1, wherein at least one of upper surfaces and lower surfaces of the first and second magnets has the same or a different height.

7. The motor of claim 1, further comprising a fluid dynamic pressure bearing part formed in at least one of the shaft and the sleeve and providing radial dynamic pressure to the shaft by oil filled between the shaft and the sleeve.

8. A motor comprising:
    a shaft provided with a first magnet;
    a hub coupled to the shaft and rotating together with the shaft;
    a sleeve supporting the shaft and including a second magnet configuring a magnetic bearing part together with the first magnet;
    a fluid dynamic pressure bearing part formed in at least one of the shaft and the sleeve;
    a base including a coupling part protruding upwardly in an axial direction so that the sleeve and a core including a coil wound therearound are coupled thereto; and a wall part protruding from the hub so as to divide a space between a support part supporting an outer peripheral surface of the second magnet of the sleeve and the coupling part, wherein a gap between the first and second magnets is larger than at least one of a contact prevention gap, which is at least one of the divided spaces, and a clearance between the shaft and the sleeve.

9. A motor comprising:

a shaft including a first magnet;

a sleeve supporting the shaft and including a second magnet configuring a magnetic bearing part together with the first magnet;

a hub coupled to the shaft and rotating together with the shaft;

a wall part protruding from the hub in an axial direction; and a base including a coupling part protruding upwardly in an axial direction, the coupling part located, wherein a gap between the first and second magnets, in a radial direction, is larger than a contact prevention gap between an inner peripheral surface of the coupling part and an outer peripheral surface of the wall part, in a radial direction.

* * * * *